United States Patent
Goujon et al.

(10) Patent No.: US 7,352,654 B2
(45) Date of Patent: Apr. 1, 2008

(54) COUPLING AID FOR SEISMIC CABLE

(75) Inventors: Nicolas Goujon, Oslo (NO); Johan Fredrik Naes, Trondheim (NO); Rune Voldsbekk, Drammen (NO); Lars Ranheim, Nykirke (NO)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 10/547,942

(22) PCT Filed: Mar. 5, 2004

(86) PCT No.: PCT/EP2004/050266

§ 371 (c)(1),
(2), (4) Date: Sep. 2, 2005

(87) PCT Pub. No.: WO2004/079398

PCT Pub. Date: Sep. 16, 2004

(65) Prior Publication Data
US 2006/0171253 A1    Aug. 3, 2006

(30) Foreign Application Priority Data
Mar. 7, 2003  (GB) ................................ 0305246.1

(51) Int. Cl.
*G01V 1/16* (2006.01)
(52) U.S. Cl. .................................................... 367/188
(58) Field of Classification Search ................ 367/188, 367/15, 141; 181/110
See application file for complete search history.

(56) References Cited

U.S. PATENT DOCUMENTS

| 5,434,828 | A | * | 7/1995 | Logan ......................... 367/188 |
| 5,866,827 | A |   | 2/1999 | Stewart et al. |
| 6,288,972 | B1 |  | 9/2001 | Norris |
| 6,367,211 | B1 | * | 4/2002 | Weener et al. ............. 52/220.1 |
| 6,385,132 | B1 | * | 5/2002 | Sackett ........................ 367/188 |
| 2005/0146987 | A1 | * | 7/2005 | Goujon et al. ............. 367/188 |

FOREIGN PATENT DOCUMENTS

| EP | 0593416 | 4/1994 |
| FR | 2446494 | 8/1980 |
| WO | WO 01/51955 | 7/2001 |
| WO | WO 02/14905 | 2/2002 |

OTHER PUBLICATIONS

Gaiser, "Compensating OBC data for variations in geophone coupling," 68th Ann. Mtg., SEG, 1429-1432, 1998.

* cited by examiner

*Primary Examiner*—Mark Hellner
(74) *Attorney, Agent, or Firm*—Jeffrey A. Pyle; Liangang (Mark) Ye; Jeffrey E. Griffin (57) ABSTRACT

The present invention provides a coupling device (300). The coupling device includes a collar (315, 405) defining an opening therethrough to receive a seismic sensor (305) such that the collar (315, 405) permits rotation about the seismic sensor (305) and at least three extensions (320, 410) from the collar, the extensions (320, 410) being capable of rotating with the collar (315, 405) such that any two of them may couple to the ground.

30 Claims, 5 Drawing Sheets

COUPLING AID FOR SEISMIC CABLE

BACKGROUND OF THE INVENTION

1. Field of the Invention

This invention relates generally to marine seismic surveying, and, more particularly, to a coupling aid for seismic cables used in marine seismic surveying.

2. Description of the Related Art

Seismic exploration is widely used to locate and/or survey subterranean geological formations for hydrocarbon deposits. As many commercially valuable hydrocarbon deposits are located beneath bodies of water, various types of marine seismic surveys have been developed. In a typical marine seismic survey, an array of marine seismic cables is deployed at the sea-floor. The seismic cables may be several thousand meters long and contain a large number of seismic sensors, such as hydrophones and geophones, associated electronic equipment, which are distributed along the length of the each seismic cable. Power is provided to the seismic sensors via wires, cables, and the like, which are run through the seismic cable. Signals may also be transmitted to and from the seismic sensors by additional wires, cables, and the like.

The seismic sensors typically include one or more seismic sensing elements deployed in a sensor housing. The sensor housing protects the seismic sensing elements from being exposed to external pressure and from water intrusion when they are deployed underwater. For example, the sensor housing may reduce the amount of sea-water that reaches the seismic sensing elements and therefore may reduce the corrosive effects of the sea water on the seismic sensing elements. When the sensor is disposed on the sea floor, the sensor housing couples the seismic sensing elements to the sea-floor. The seismic coupling allows signals, e.g. acoustic signals, travelling in the sea-floor to be sensed and recorded by the seismic sensing elements in the sensor housing.

A survey vessel typically tows one or more seismic sources, such as airguns and the like, over the seismic cables. Acoustic signals, or "shots," produced by the seismic sources propagate down through the water into the earth beneath, where they are reflected from the various earth strata. The reflected signals are received by the seismic sensors in the seismic cables, digitised, and then transmitted to the seismic survey vessel, where they are recorded and at least partially processed with the ultimate aim of building up a representation of the earth strata in the area being surveyed. Analysis of the representation may indicate probable locations of geological formations and hydrocarbon deposits.

The reflected signals include a pressure and an elastic wave field. The pressure is a scalar quantity and the elastic wave-field is a vector quantity. Thus, to characterise the elastic wave-field, the seismic sensing elements measure the components of the elastic wave-field in three orthogonal directions. For example, the selected three directions may be an x-direction, which is defined as being parallel to the seismic cable and is often referred to as the "in-line direction," a y-direction, which is defined as being perpendicular to the seismic cable and is often referred to as the "cross-line direction," and a z-direction, which is defined as the vertical direction. The use of this so-called "four-component" seismic data has proven to be very successful for imaging through gas-saturated overburdens and for characterising hydrocarbon reservoirs through lithography identification and fluid discrimination.

Figure 1A:
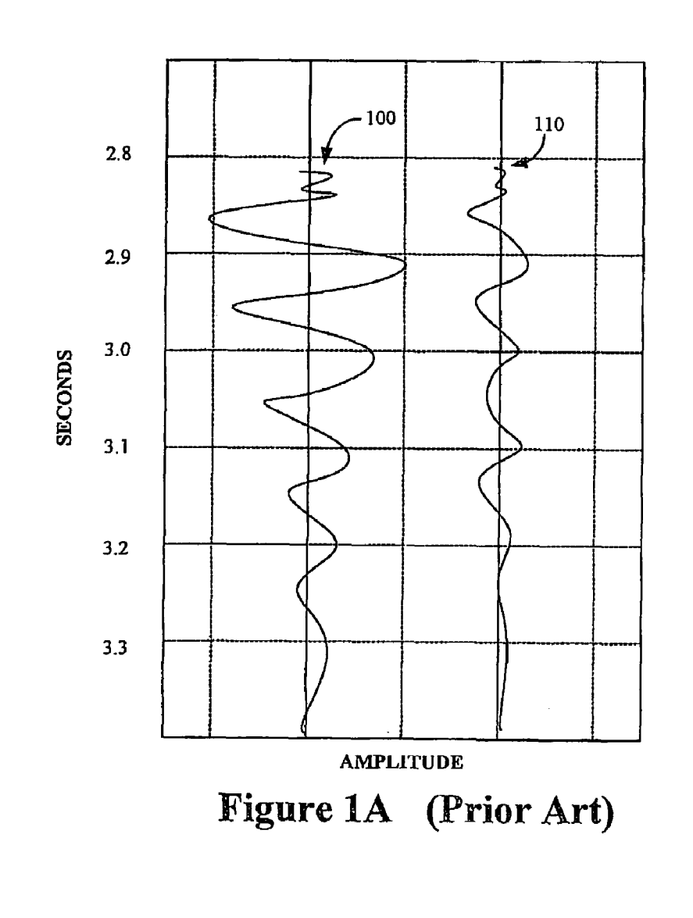
FIGS. 1A-B each conceptually illustrate aspects of a prior art measurement of components of an elastic wave field.
Figure 1B:
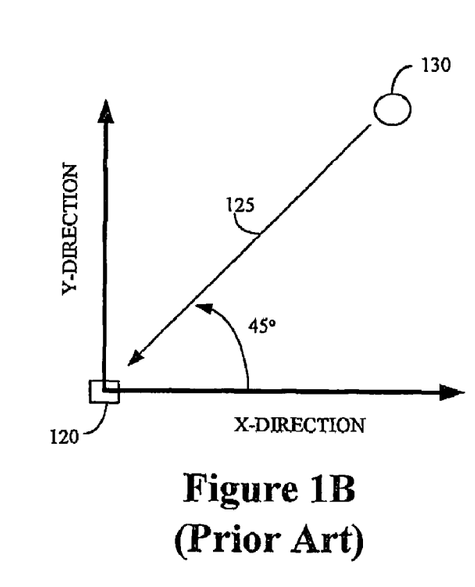

The reliability of conventional methods of recording four-component seismic data is typically reduced by vector infidelity between the in-line and the cross-line directions. For example, FIG. 1A shows the x-component 100 and y-component 110 of the elastic wave-field as measured by a conventional seismic sensor 120, as shown in FIG. 1B. The seismic energy 125 in the elastic wave-field provided by a seismic source 130 is incident on the seismic sensor 120 at a 45° angle. Since the seismic energy 125 makes an equal angle with the x-direction and the y-direction, the amplitudes of the x-component 100 and y-component 110 of the elastic wave-field should be equal.

However, poor seismic coupling between the sensor housing and the seafloor provided by conventional sensor housings may create vector infidelities. These vector infidelities may result in the seismic sensor recording different amplitudes for the x-component 100 and y-component 110 of the elastic wave-field, as shown in FIG. 1A. For example, cylindrical sensor housings may roll on the sea floor, which may reduce the fidelity of recordings of cross-line components and may also reduce the fidelity of the vertical component.

A variety of hardware solutions have been developed to attempt to reduce vector infidelity in data acquisition. For example, the patent U.S. Pat. No. 6,288,972 entitled, "Cable Mounted Cleated Housing for Engaging the Seabed," describes cleats that may be mounted on the outside of the sensor housing. The cleated boots may improve the seismic coupling by penetrating the sediments on the sea-floor. However, the cleats sometimes may not allow good transfer of motion perpendicular to the cable and sometimes may not be able to avoid mechanical resonances. The cleated boot may also not be able to rotate and may therefore be deployed on an edge, which may further increase the vector infidelity. For another example, the patent number WO 02/14905 A1, entitled "A Housing for a Seismic Sensing Element and a Seismic Sensor," describes a seismic sensor housing with a substantially flat base wherein the maximum extent of the base in the in-line and the cross-line directions is substantially equal. However, this seismic sensor housing is cumbersome and difficult to handle.

Deconvolution operators may be designed to partially reduce vector infidelity in the analysis of collected data. For example, the patent publication WO 01/51955 discloses a method of correcting seismic data for vector infidelity by generating a correction factor. For another example, an alternative deconvolution method has been proposed in the publication, "Compensating OBC data for variations in geophone coupling," Proceedings of the $68^{th}$ Annual Meeting of the Society of Exploration Geophysicists (1998), pp. 1429-1432. However, the distortions of the components of the elastic wave-field are often too large for deconvolution to remove the vector infidelity during analysis.

SUMMARY OF THE INVENTION

In one aspect of the instant invention, a coupling device is provided. The coupling device includes a collar defining an opening therethrough to receive a seismic sensor such that the collar permits rotation about the seismic sensor and at least three extensions from the collar, the extensions capable of rotating with the collar such that any two of them may couple to the ground.

In another aspect of the present invention, an apparatus is provided. The apparatus includes a seismic cable, a plurality of sensor housings coupled to the cable, and a plurality or seismic coupling devices coupled to the plurality of sensor housings such that each seismic coupling device is capable of rotating about a corresponding one of the sensor housing. The plurality of seismic coupling devices include a collar defining an opening therethrough to receive the sensor housing such that the collar permits rotation about the sensor housing and at least three extensions from the collar, the extensions capable of rotating with the collar such that any two of them may couple to the ground.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
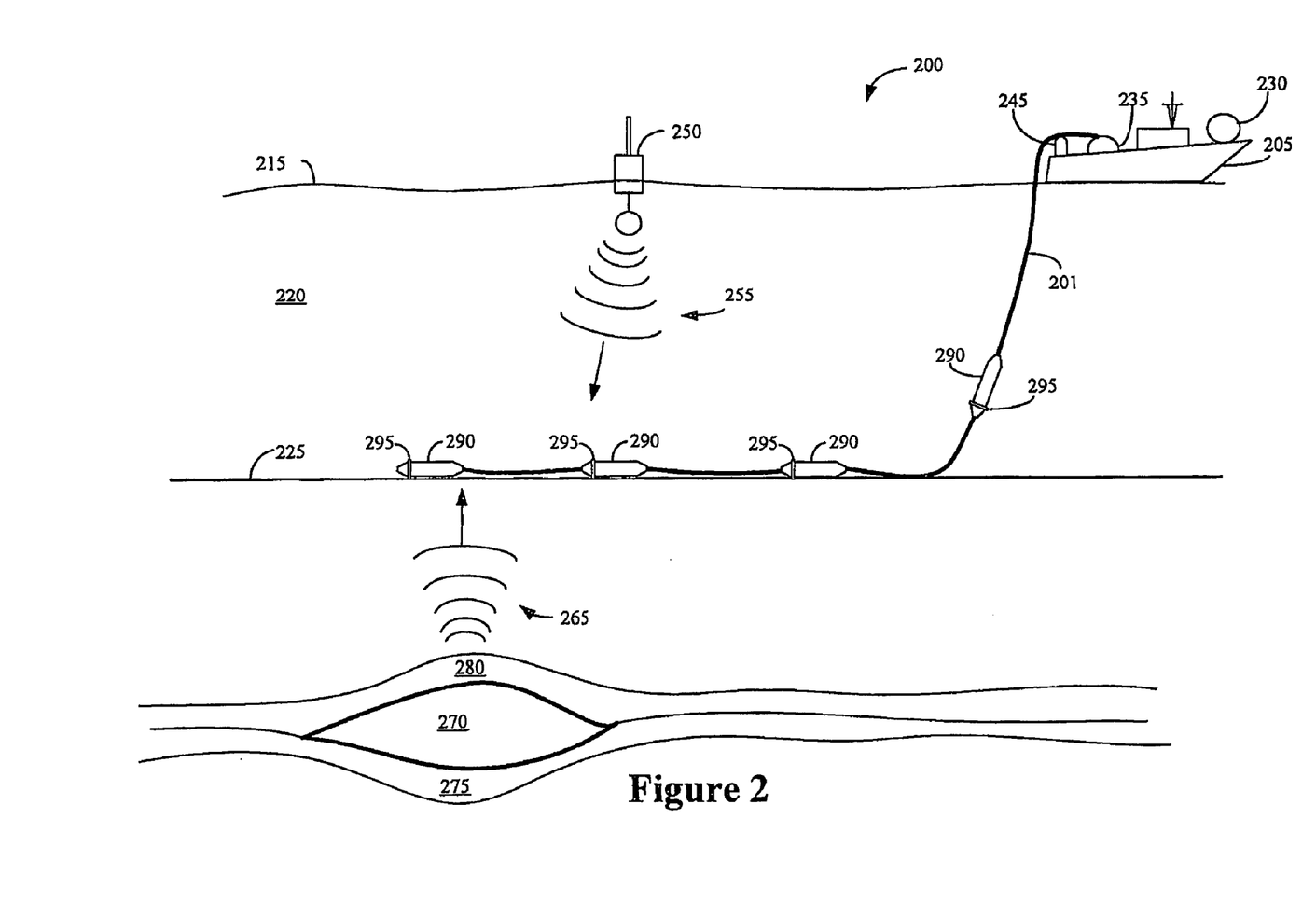
FIG. 2 shows an exemplary system for seismic surveying using a seismic cable.

FIG. 2 shows an exemplary system 200 for seismic surveying using a seismic cable 201. The exemplary system 200 includes a survey vessel 205, which deploys the seismic cable 201 at a surface 215 of a body of water 220, which, in alternative embodiments, may be freshwater, salt water, or brackish water. In the illustrated embodiment, the seismic cable 201 is deployed by offloading the seismic cable 201 from the survey vessel 205, descent through the catenary to the floor 225 of the body of water 220, and positioning the seismic cable 201. For example, the seismic cable 201 may be deployed in a sea, descend to a sea bed, and then be positioned on the sea bed. However, although only one seismic cable 201 is shown in FIG. 1, the present invention is not so limited. In alternative embodiments, more seismic cables 201 may be deployed without departing from the scope of the present invention. In particular, an array of seismic cables 201 may be deployed. In yet other alternative embodiments, the seismic cables 201 may be deployed on land.

The seismic cable 201 is typically transported, deployed, and retrieved by a variety of devices including, but not limited to, storage drums 230, drum engines and winches 235, sheaves 245, and the like. In one embodiment, the storage drums 230 are carried on the vessel 205, although, in alternative embodiments, the storage drums 230 may be at any desirable location, including on land. The drum engines 235 are typically positioned near the stem of the vessel 205 and are used to deploy and retrieve the seismic cable 201, which typically passes over a sheave 245 positioned at the stem of the vessel 205. As storage drums 230, drum engines and winches 235, and sheaves 245 are well-known in the art and not material to the present invention, they will not be described in any more detail herein.

One or more seismic sources 250 provide a seismic survey signal 255. For example, the seismic sources 250 may be towed by a second vessel (not shown). In one embodiment, the seismic survey signal 255 may be a broadband acoustic signal with a range of frequencies from 0 to about 120 250 Hz provided by a towed array of sources 250. The seismic survey signal 255 propagates into the earth and forms a reflected signal 265 when the seismic survey signal 255 reflects from one or more geologic formations 270, such as hydrocarbon deposits, that are located in earth strata 275, 280.

One or more sensors 290 are coupled to the seismic cables 201 and receive the reflected signals 265. The reflected signals 265 include a pressure and an elastic wave field. The one or more sensors 290 may therefore measure four components: the pressure and three orthogonal components of the elastic wave field, such as the components along the in-line direction, the cross-line direction, and the vertical direction. However, the present invention is not so limited. In alternative embodiments, any desirable combination of components of the reflected signal 265 may be measured. For example, in one alternative embodiment, only components of the elastic wave field along the in-line and cross-line directions may be measured.

Analysis of the reflected signals 265 received by the sensors 290 is used to form a representation of the earth strata proximate to the sensors 290 and thus to locate and/or survey the geologic formations 270, 275, 280. One or more seismic coupling devices 295 are coupled to the one or more of the seismic sensors 290. As will be described in more detail below, the seismic coupling devices 295 may improve the seismic coupling between the seismic sensors 290 and the sea floor 225 and, consequently, may reduce vector infidelity and improve the reliability of the analysis of the reflected signals 265.

Figure 3A:
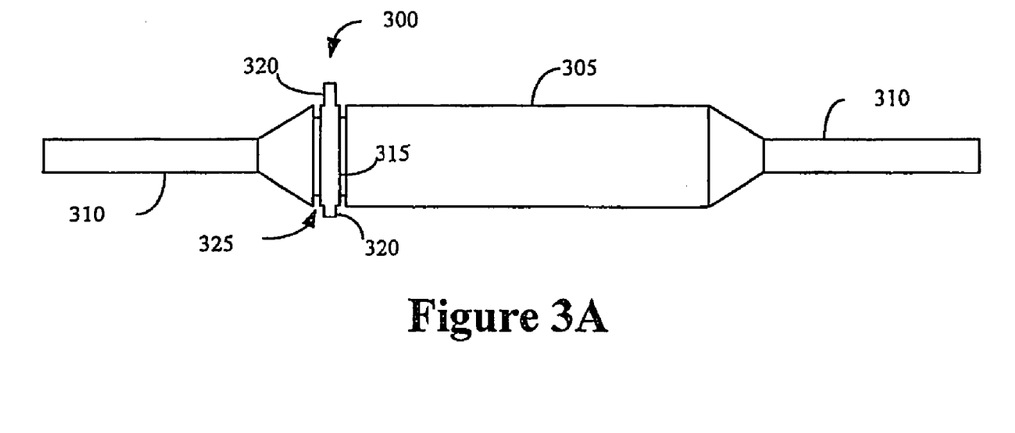
FIG. 3A conceptually illustrates an edge-on view of a first embodiment of a seismic coupling device and a sensor housing that may be used in the system shown in FIG. 2.

FIG. 3A conceptually illustrates an edge-on view of a first embodiment of a sensor housing 305 having a seismic coupling device 300. The sensor housing 305 is coupled to a seismic cable 310, in a manner known to those of ordinary skill in the art having benefit of the present disclosure. The seismic coupling device 300 includes a collar 315 and at least three extensions 320. However, in alternative embodiments, the seismic coupling device 300 may include other numbers of extensions 320. The collar 315 and the three extensions 320 may, in various alternative embodiments, be formed of a metal, a hard plastic, rubber, or any other like material. Although not shown in FIG. 3A, it will be appreciated by those of ordinary skill in the art having benefit of the present disclosure that, in various alternative embodiments, the collar 315 may also include components such as lubricants, bearings, gaskets, brushes, and the like.

In the first embodiment, the seismic coupling device 300 is positioned in a groove 325 in the sensor housing 305 such that the coupling device 300 may rotate about the sensor housing 305. The rotation occurs within the groove 325. In one embodiment, the coupling device 300 may be free to rotate about the sensor housing 305. However, in alternative embodiments, rotation of the coupling device 305 may be limited. For one example, as will be discussed in detail below, it may be desirable to inhibit the rotation of the sensor housing 305 when the seismic coupling device 300 is in contact with the sea floor. For another example, the seismic coupling device 300 may be held in place by, e.g. clamps or other restraining devices until such time as it is desirable to allow the seismic coupling device to rotate. For yet another example, the rotation of the seismic coupling device 300 may be limited to a pre-determined angle of rotation. In a second embodiment shown in FIG. 3B, first and second seismic coupling devices 300 are positioned in first and second grooves 325 in the sensor housing 305.

Figure 3B:
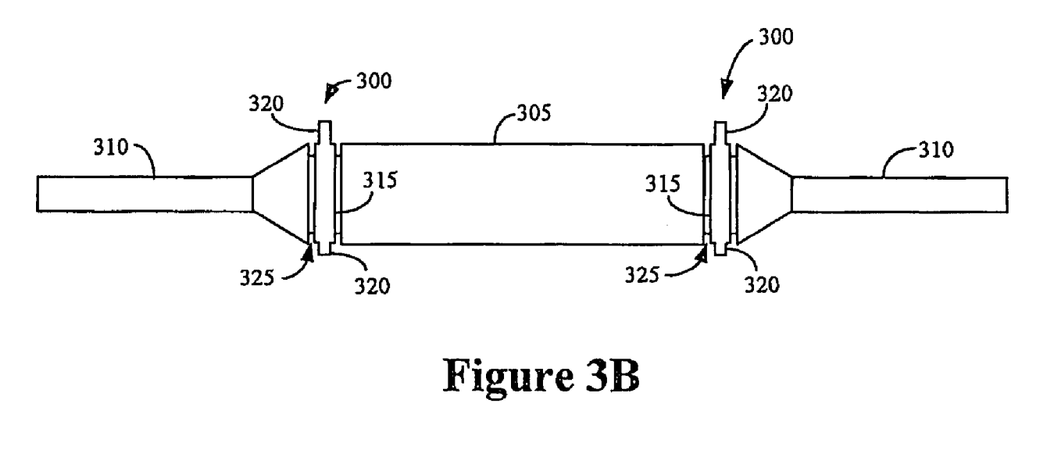
FIG. 3B conceptually illustrates an edge-on view of a second embodiment of a sensor housing having a seismic coupling device that may be used in the system shown in FIG. 2.

As the seismic coupling devices 300 illustrated in FIGS. 3A-B are able to rotate about the sensor housing 305, the seismic coupling devices 300 may orient themselves as the sensor housing 305 descends through the body of water 220. Furthermore, when the sensor housing 305 comes to rest on the sea floor 225, the seismic coupling devices 300 may rotate to provide at least two support points to stabilize the sensor housing 305. For example, the seismic coupling device 300 may rotate to provide two points of contact that stabilize the sensor housing 305 in the cross-line direction. For another example, the seismic coupling device 300 may rotate to provide two points of contact that, together with one or more points of contact on the sensor housing 305, stabilize the sensor housing 305 in the in-line direction.

Figure 4A:
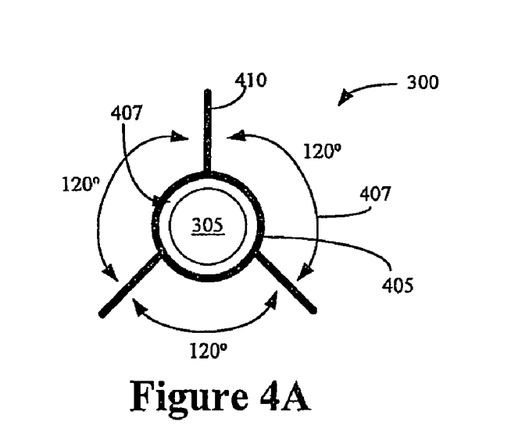
FIGS. 4A-C conceptually illustrate face-on views of first, second, and third exemplary embodiments of the seismic coupling device first shown in FIGS. 3A-B.

FIG. 4A conceptually illustrates a face-on view of a first exemplary embodiment of a seismic coupling device 300. The seismic coupling device 300 includes a collar 405 having an opening 407 for receiving the sensor housing 305. The collar 405 is free to rotate about the sensor housing 305 as indicated by the arrows 407.

In the first exemplary embodiment, three extensions 410 are coupled to the collar 405. In one embodiment, the three extensions 410 are rigidly coupled to the collar 405 by affixation using a technique such as welding, brazing, and the like. Alternatively, the collar 405 and the three extensions 410 may be formed as a single piece of metal, hard plastic, or rubber. However, the present invention is not so limited. In various alternative embodiments, the three extensions 410 may be retractably coupled to the collar 405. For example, the three extensions 410 may be coupled to the collar 405 by one or more hinges (not shown) that permit the three extensions 410 to be retracted when so desired. For another example, the three extensions 410 may be coupled to the collar 405 by a spring, a deformable material, or the like. Moreover, the collar 405 and the three extensions 410 need not be formed of the same material.

In the illustrated embodiment, the three extensions 410 are of equal length and separated by equal angles. For example, the three extensions 410 may each have a length of about 5 centimeters and be separated by an angle of 120°. By coupling three extensions 410 of equal length and separated by equal angles to the collar 405, which is free to rotate about the sensor housing 305, the three extensions 410 may orient themselves to provide at least two points of contact to stabilize the sensor housing 305 in the cross-line direction. However, it will be appreciated by those of ordinary skill in the art having benefit of the present disclosure that the length of the extensions 410, as well as the angles that separate the extensions 410, may vary within certain pre-determined tolerances. The size of the tolerances is a matter of design choice and not material to the present invention.

Figure 4B:
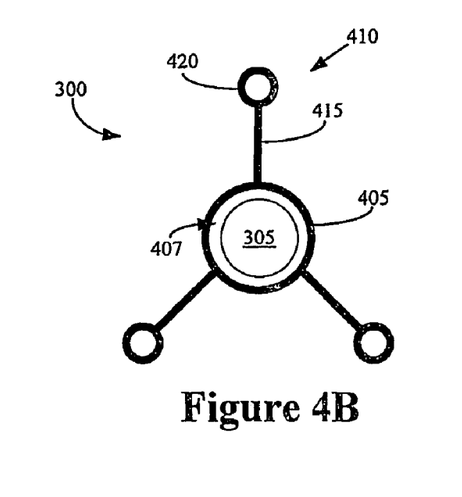

FIG. 4B conceptually illustrates a face-on view of a second exemplary embodiment of the seismic coupling device 300. In this particular embodiment, the extensions 410 of the seismic coupling device 300 include three arms 415 and three endpieces 420 having no sharp edges. Consequently, potential damage to the seismic cable 310, e.g., while deploying the seismic cable 310 from a drum engine 235 or storing the seismic cable 310 on a drum 230, may be reduced. In various alternative embodiments, the endpieces 420 may be substantially spherical and may be formed of rubber, hard plastic, or any other desirable material. Furthermore, the endpieces 420 may be hollow, i.e. the endpieces 420 may define an empty cavity. In one embodiment, the endpieces 420 may be coupled to the arms 415 to form the extensions 410. However, in alternative embodiments, the endpieces 420 may be formed of a piece with the arms 415.

Figure 4C:
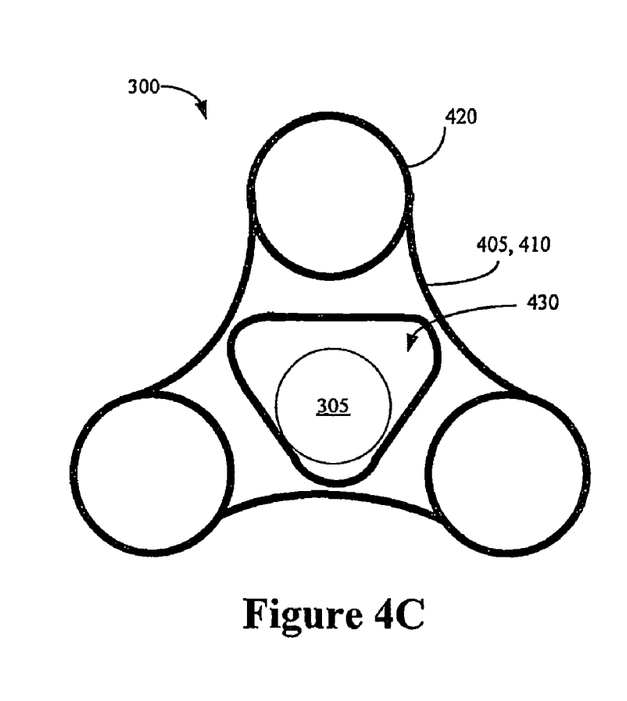

FIG. 4C conceptually illustrates a face-on view of a third exemplary embodiment of the seismic coupling device 300. In th third exemplary embodiment, the collar 405 and the three extensions 410 are formed of a single piece, although this is not necessary for the practice of the invention. For example, the collar 405 and the three extensions 410 may be formed as a single piece of metal, hard plastic, or rubber. Three endpieces 420 are attached to the three extensions 410, although this is likewise not necessary for the practice of the present invention.

An opening 430 in the collar 405 may be formed such that the rotation of the sensor housing 305 is reduced, or completely stopped, when the seismic coupling device 300 is in contact with the sea floor 225. In the embodiment illustrated in FIG. 4C, the opening 430 is triangular and oriented in a manner that is inverted compared to the triangle formed by the three extensions 410. Furthermore, the opening 430 has rounded corners. When the seismic cable 201 is descending through the body of water 220, the third exemplary embodiment of the seismic coupling device 300 rotates freely about the sensor housing 305. However, when the seismic coupling device 300 comes to rest at the sea floor, gravity may draw the sensor housing 305 into contact with portions of the opening 430, which may reduce, or completely stop, rotation of the sensor housing 305.

Figure 5A:
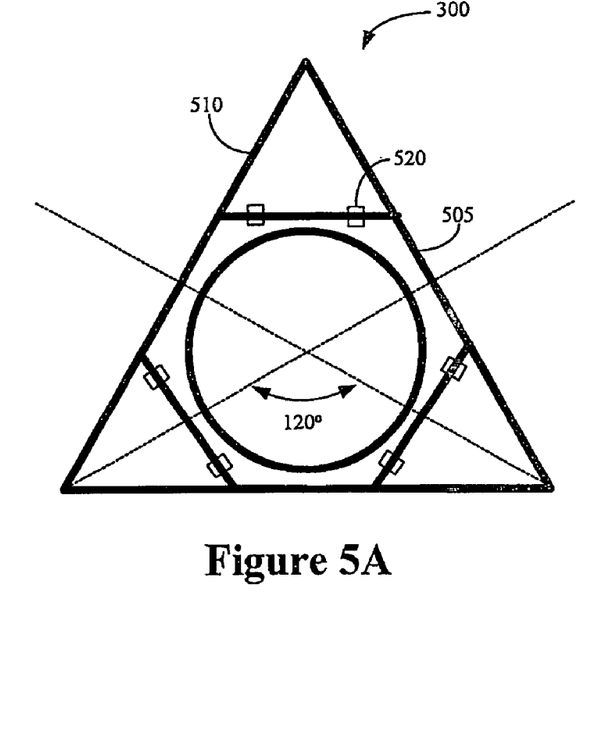
FIGS. 5A-B conceptually illustrate face-on views of fourth and fifth exemplary embodiments of the seismic coupling device shown in FIGS. 3A-B.

FIG. 5A conceptually illustrates a face-on view of a fourth exemplary embodiment of the seismic coupling device 300. The seismic coupling device 300 includes a collar 505 having an opening for receiving the sensor housing 305. The collar 505 is free to rotate about the sensor housing 305. Although the collar 505 shown in FIG. 5A is hexagonal, this is a matter of design choice and not necessary for the practice of the present invention. In alternative embodiments, any desirable shape may be used.

In the fourth exemplary embodiment, the collar 505 has three extensions 510. In one embodiment, the three extensions 510 are rigidly coupled to the collar 505. For example, the collar 505 and the three extensions 510 may be formed as a single piece of metal, hard plastic, rubber, or any other desirable material. However, the present invention is not so limited. In various alternative embodiments, the three extensions 510 may be retractably coupled to the collar 505. For example, the three extensions 510 maybe coupled to the collar 505 by one or more hinges 520 that permit the three extensions 510 to be retracted when so desired. Moreover, the collar 505 and the three extensions 510 need not be formed of the same material, nor is the present invention limited to three extensions 510. For example, in alternative embodiments, four or five extensions 510 may be used.

In the illustrated embodiment, the three extensions 510 are triangular. However, in an alternative embodiment, the three extensions 510 may be triangular with rounded corners. The extensions 510 are deployed about the collar 505 such that the vertices of the triangles are separated by equal angles. For example, the vertices of the extensions 510 may be separated by an angle of 120°. By coupling three triangular extensions 510 whose vertices are separated by equal angles to the collar 505, which is able to rotate about the sensor housing 305, the three extensions 510 may orient themselves to provide a line of contact to stabilize the sensor housing 305 in the cross-line direction. However, it will be appreciated by those of ordinary skill in the art having benefit of the present disclosure that the shape of the extensions 510, as well as the angles that separate the extensions 510, may vary within certain pre-determined tolerances. The size of the tolerances is a matter of design choice and not material to the present invention.

Figure 5B:
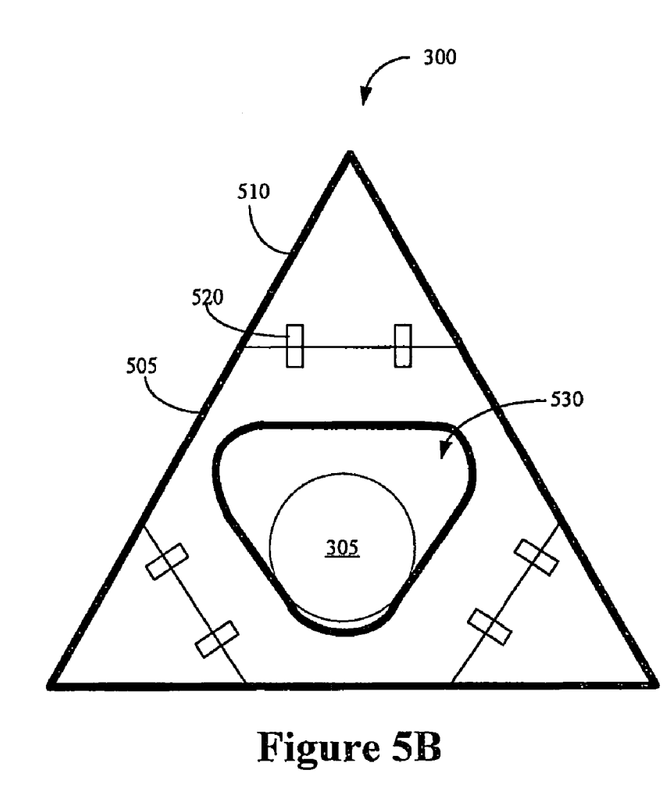

FIG. 5B conceptually illustrates a face-on view of a fifth exemplary embodiment of the seismic coupling device 300. An opening 530 in the collar 505 may be formed such that the rotation of the sensor housing 305 is reduced, or completely stopped, when the seismic coupling device 300 is in contact with the sea floor 225. In the fifth exemplary embodiment, the opening 530 is substantially triangular with rounded corners and oriented in a manner that is inverted compared to the triangle formed by the three extensions 510. When the seismic cable 201 is descending through the body of water 220, the fifth exemplary embodiment of the seismic coupling device 300 rotates freely about the sensor housing 305. However, when the seismic coupling device 300 comes to rest at the sea floor, gravity may draw the sensor housing 305 into contact with portions of the opening 530, which may reduce, or completely stop, rotation of the sensor housing 305.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A coupling device, comprising:
a collar defining an opening therethrough to receive a seismic sensor such that the collar permits rotation about the seismic sensor, the collar having a dimension parallel to an axial direction of the seismic sensor that is smaller than a corresponding dimension of the seismic sensor parallel to the axial direction; and
at least three extensions from the collar, the extensions capable of rotating with the collar such that any two of them may couple to the ground.

2. The coupling device of claim 1, wherein at least one of the three extensions comprises an arm and an endpiece.

3. The coupling device of claim 1, wherein the extensions are coupled to the collar.

4. The coupling device of claim 1, wherein the at least three extensions are retractably coupled to the collar by at least three hinges.

5. The coupling device of claim 1, wherein the extensions are triangular in cross-section.

6. The coupling device of claim 1, wherein the at least three extensions are separated by equal angles.

7. An apparatus, comprising:
a seismic cable;
a plurality of sensor housings coupled to the cable; and
a plurality of seismic coupling devices coupled to the plurality of sensor housings such that each seismic coupling device is capable of rotating about a corresponding one of the sensor housing, wherein the seismic coupling devices comprise:
a collar defining an opening therethrough to receive the sensor housing such that the collar permits rotation about the sensor housing, the collar having a dimension parallel to an axial direction of the seismic sensor that is smaller than a corresponding dimension of the seismic sensor parallel to the axial direction; and
at least three extensions from the collar, the extensions capable of rotating with the collar such that any two of them may couple to the ground.

8. The apparatus of claim 7, wherein the plurality of sensor housings each defines a groove for receiving the seismic coupling devices.

9. The apparatus of claim 7, wherein each of the seismic coupling devices defines an opening for receiving the sensor housing.

10. The apparatus of claim 9, wherein the opening comprises a triangular opening.

11. The apparatus of claim 10, wherein the three extensions have a triangular cross-section and the orientation of the triangular opening is inverted relative to the triangular cross-section of the three extensions.

12. The apparatus of claim 7, wherein each of the at least three extensions comprises an endpiece.

13. The apparatus of claim 12, wherein the endpiece is spherical.

14. The apparatus of claim 7, further comprising at least three hinges, and wherein the at least three extensions are retractably coupled to the collar by the at least three hinges.

15. The apparatus of claim 7, wherein the at least three extensions are retractably coupled to the collar by at least three springs or deformable materials.

16. The apparatus of claim 7, wherein the at least three extensions are triangular.

17. The apparatus of claim 7, wherein the at least three extensions are separated by equal angles.

18. The apparatus of claim 7, wherein the collar and each of the at least three extensions are formed of at least one of a metal, hard plastic, and rubber.

19. The apparatus of claim 7, wherein each of the plurality of seismic coupling devices are coupled near an end of each of the plurality of sensor housings.

20. A coupling device, comprising:
a collar defining a triangular opening therethrough to receive a seismic sensor such that the collar permits rotation about the seismic sensor, the collar having a dimension parallel to an axial direction of the seismic sensor that is smaller than a corresponding dimension of the seismic sensor parallel to the axial direction; and at least three extensions from the collar, each of the extensions having a triangular cross-section whose orientation is inverted relative to the triangular opening and being capable of rotating with the collar such that any two of them may couple to the ground.

21. The coupling device of claim 20, wherein the extensions are coupled to the collar.

22. The coupling device of claim 20, wherein the at least three extensions are separated by equal angles.

23. A coupling device, comprising:

a collar defining an opening therethrough to receive a seismic sensor such that the collar permits rotation about the seismic sensor, the collar having a dimension parallel to an axial direction of the seismic sensor that is smaller than a corresponding dimension of the seismic sensor parallel to the axial direction; and at least three extensions from the collar, the extensions capable of rotating with the collar such that any two of them may couple to the ground, at least one of the three extensions including an arm and a spherical endpiece.

24. The coupling device of claim 23, wherein the endpiece defines an empty cavity.

25. The coupling device of claim 23, wherein the extensions are coupled to the collar.

26. The coupling device of claim 23, wherein the extensions are triangular in cross-section.

27. The coupling device of claim 23, wherein the at least three extensions are separated by equal angles.

28. A coupling device, comprising:

a collar defining an opening therethrough to receive a seismic sensor such that the collar permits rotation about the seismic sensor, the collar having a dimension parallel to an axial direction of the seismic sensor that is smaller than a corresponding dimension of the seismic sensor parallel to the axial direction; and at least three extensions from the collar, the extensions being retractably coupled to the collar by a spring or a deformable material and being capable of rotating with the collar such that any two of them may couple to the ground.

29. The coupling device of claim 28, wherein the extensions are triangular in cross-section.

30. The coupling device of claim 28, wherein the at least three extensions are separated by equal angles.

* * * * *